United States Patent [19]

Bot

[11] Patent Number: 5,148,589
[45] Date of Patent: Sep. 22, 1992

[54] SICKLE SECTION BLADE REPLACEMENT TOOL

[76] Inventor: Frederick R. Bot, R.R. 1, Box 114, Ivanhoe, Minn. 56142

[21] Appl. No.: 732,624

[22] Filed: Jul. 19, 1991

[51] Int. Cl.⁵ ............................................. B23P 11/00
[52] U.S. Cl. .................................................. 29/243.54
[58] Field of Search ................ 254/100, 133, DIG. 1; 29/243.53, 243.54, 243.55, 283, 283.5, 522, 525, 526, 509, 251, 252; 264/102; 59/7, 11; 72/965, 966, 391, 396, 953.19, 953.15, 953.16, 312, 313, 325

[56] References Cited

U.S. PATENT DOCUMENTS

| | | |
|---|---|---|
| 1,692,004 | 4/1928 | Tolmie . |
| 1,916,623 | 11/1933 | Kulp et al. . |
| 2,627,766 | 10/1953 | Marchant . |
| 3,131,902 | 5/1964 | Zak ........................ 254/100 |
| 3,230,751 | 9/1966 | Smith . |
| 3,233,402 | 2/1966 | Urbaitis ................... 29/243.54 |
| 3,234,634 | 2/1966 | Johnson et al. .......... 29/243.54 |
| 3,349,603 | 10/1967 | Lovig ....................... 29/243.54 |
| 3,442,111 | 3/1969 | Ledford et al. . |
| 3,555,648 | 11/1971 | Zebb . |
| 3,557,426 | 7/1971 | Day et al. . |
| 3,606,663 | 4/1972 | Ahart, Sr. . |
| 3,771,480 | 1/1973 | Johnson . |
| 3,777,966 | 7/1973 | Green . |
| 3,830,470 | 8/1974 | Gibson ........................ 254/133 |
| 4,078,291 | 3/1978 | Broemmelsiek ........... 29/283 |
| 4,118,852 | 10/1978 | Schneider .................. 29/283 |
| 4,637,113 | 1/1987 | Cook ......................... 29/243.54 |
| 4,693,406 | 4/1987 | Bartholomew et al. . |
| 4,918,798 | 4/1990 | Reed ......................... 29/243.53 |
| 4,949,446 | 8/1990 | Kuwica ..................... 29/243.53 |

Primary Examiner—Robert C. Watson
Attorney, Agent, or Firm—Burd, Bartz & Gutenkauf

[57] ABSTRACT

A tool usable for removal and replacement of rivets in changing sickle section blades on equipment such as a combine, a mower, or the like. The tool includes an upwardly open column and a shaft assembly. The shaft assembly includes an elongate threaded shaft having a lower end installed in the column. A collar is threaded on the shaft and bears against the top end of the column. The length of the tool is adjustable by rotation of the shaft with respect to the collar to move the upper end of the shaft up or down. The upper end of the shaft has a working head to support the sickle section blade during a process of removing or applying a rivet. A removable anvil is inserted in the head of the shaft assembly for the process of attaching a new rivet. The column is pivotally mounted on a stand by a lever assembly to raise and lower the column to bring the head of the shaft assembly into and out of bearing engagement with the sickle section blade for purposes of working on the sickle section blade.

7 Claims, 3 Drawing Sheets

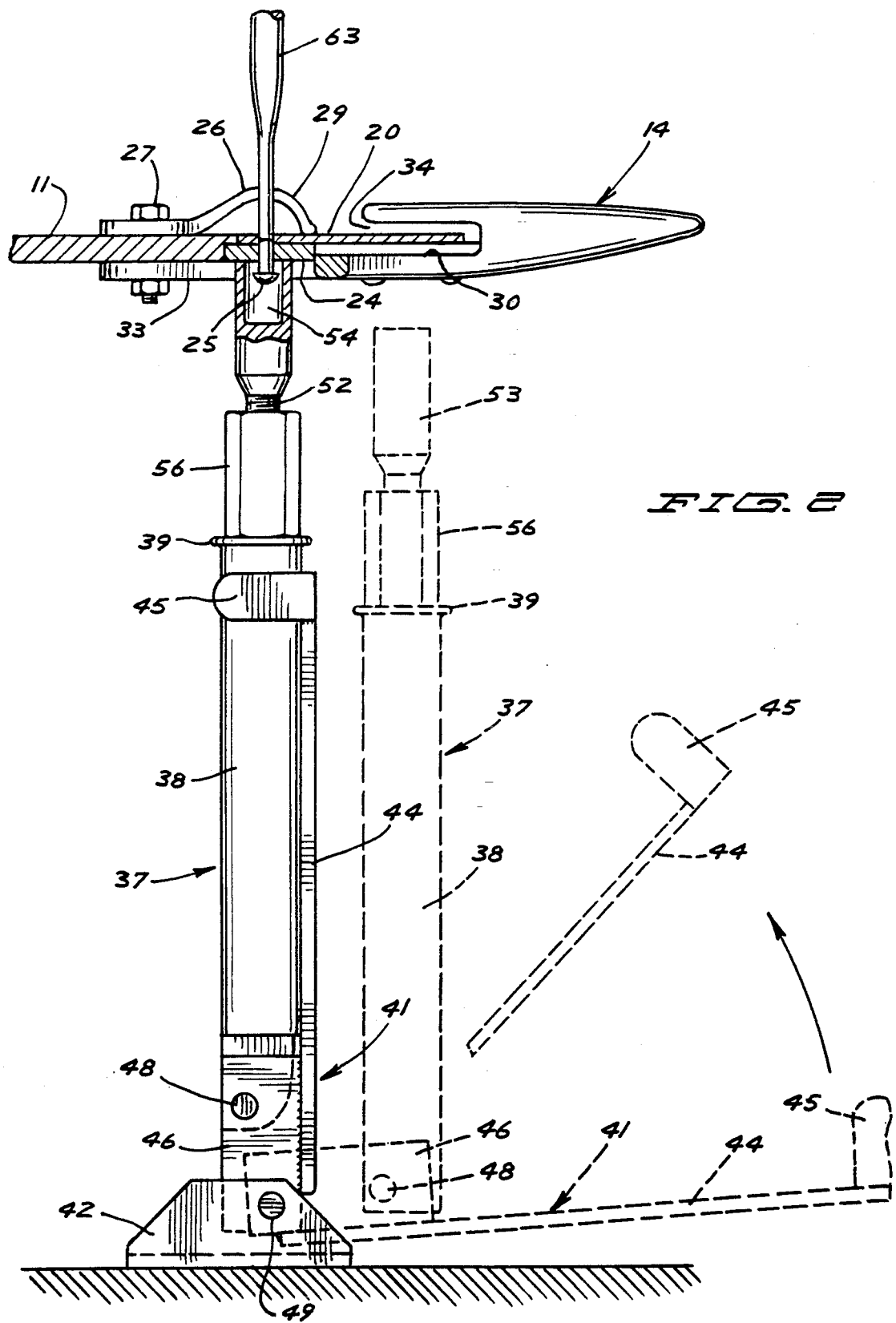

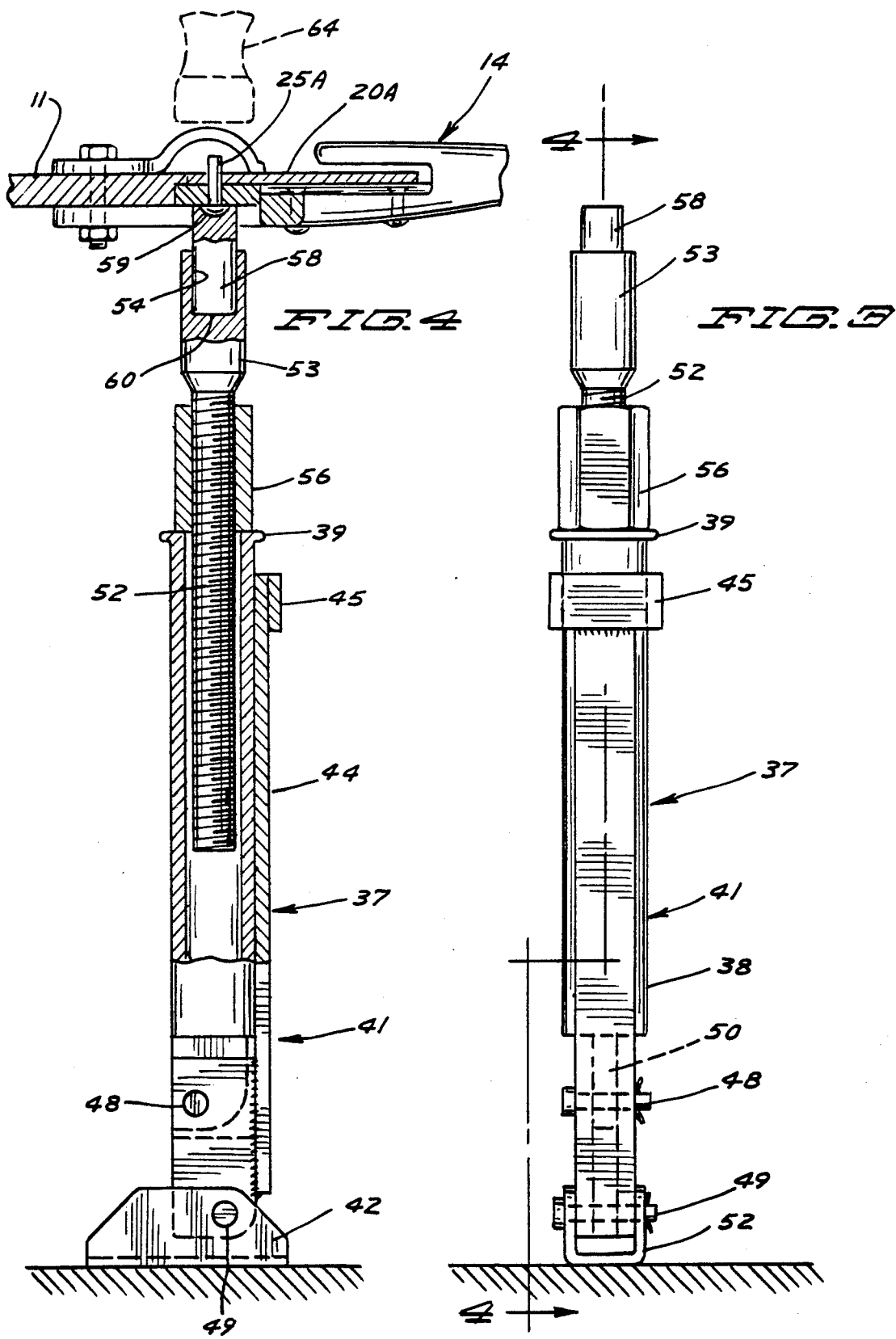

SICKLE SECTION BLADE REPLACEMENT TOOL

BACKGROUND OF THE INVENTION

Sickle bar cutters involve section blades secured by rivets to a cutter bar which is adapted to reciprocate back and forth in a groove provided therefor in the sickle bar. The section blades interact with a ledger plate associated with a guard to cut standing crop or the like. The sickle section blades are subject to damage and wear and must be periodically replaced A common method of doing so is to remove the cutting bar from the sickle bar by disconnecting the cutting bar from its connection to the driving pitman, placing the cutting bar on an anvil disposed at a different location to remove one or more of the section blades and rivet a new section blade in place thereof. This is a time comsuming procedure.

SUMMARY OF THE INVENTION

The invention relates to a tool for use in replacement of sickle section blades in place with the cutting bar remaining assembled to the sickle bar. The tool includes an adjustable height stand having a head which is positionable in abutting relationship to the bottom of the sickle blade section to provide a secure platform for working upon sickle section blades in removing the worn blade and replacing it with a new one. The stand provides a firm work surface for removing the old rivets holding the spent blade and for securing the new rivets to secure a new blade The stand includes a base and a tubular column pivotally connected to the base by a handle The tubular column has an upwardly open end The lower end of a threaded shaft fits in the open end of the tubular column. A collar is threaded on the shaft and has an outer dimension greater than that of the open end of the column such that it provides a stop and supports for the shaft relative to the column. The upper end of the shaft carries a working head. The heighth of the stand is variable by threading the shaft on the collar. The handle connecting the column to the base is movable from a lower position to an upper position. The handle includes a lever member and a pivot block. The lower end of the column is pivotally connected to the pivot block. The base is also pivotally connected t the pivot block. Movement of the lever member from a first position to a second position is operable to slightly raise the column and shaft so that the working head at the upper end of the shaft is movable into closely abutting relationship beneath a sickle section blade. The head is open ended. When the head is securely positioned beneath the spent sickle section blade, the rivet is removed using a chisel. Upon replacement of the sickle section blade, an anvil is inserted in the open end of the working head. The anvil is placed in abutting relationship to the new sickle section blade and abutting the new rivet head. In such position the other end of the rivet is peened to securely lodge the rivet with respect to the sickle section blade.

IN THE DRAWINGS

FIG. 2 is an enlarged sectional view of the sickle bar cutter of FIG. 1 taken along the line 2—2 thereof and showing a sickle section replacement tool according to the invention with portions removed for purposes of illustration and shown in place with respect to a sickle section blade being removed;

FIG. 3 is a side elevational view of the tool of FIG. 2 viewed from the right of FIG. 2 and in configuration for replacement of a rivet holding a sickle section blade to a sickle bar; and FIG. 4 is a sectional view of the tool of FIG. 3 taken along the line 4—4 thereof.

DESCRIPTION OF A PREFERRED EMBODIMENT

Figure 1:
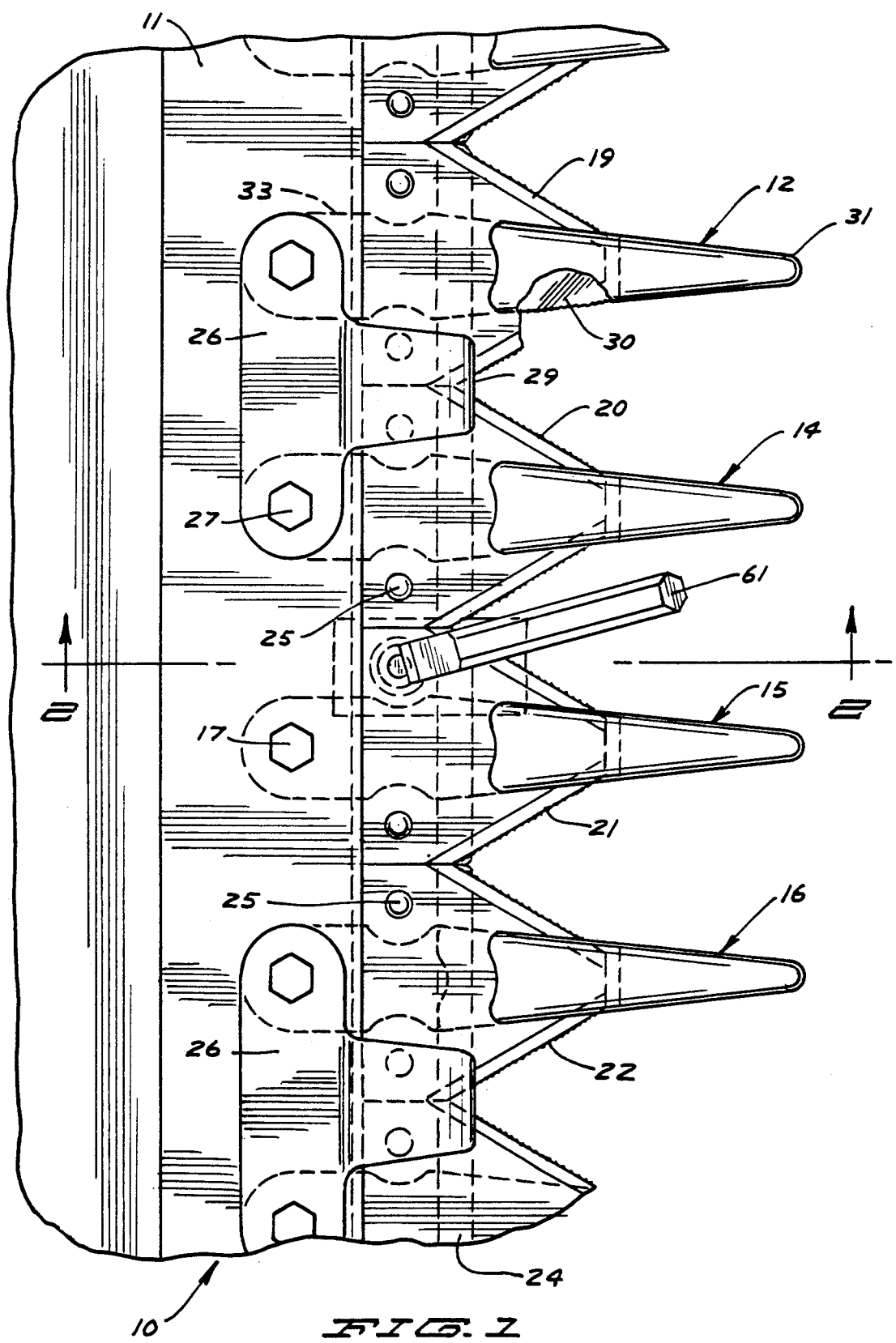
FIG. 1 is a top plan view of a portion of a sickle bar cutter with portions removed for purposes of illustration and showing a chisel poised for removal of a rivet for replacement of a sickle section blade.

Referring to the drawings, there is shown in FIG. 1 a portion of a sickle bar cutter indicated generally at 10 of the type normally associated with a combine, swather, mower or any other machinery that uses a sickle bar cutter. Sickle bar portion 10 includes a sickle bar 11 and sickle bar guards 12-16 fastened to the sickle bar 11 by bolts 17. Section blades 19-22 are fastened by rivets 25 to a cutting bar 24 which is adapted to reciprocate back and forth in a groove provided therefor in sickle bar 11. Clips 26 are fastened to sickle bar 11 by bolts 27 for forcing or holding the section blades 19-22 down against ledger plates 30 secured to the guards 12-16. Clips 26 have clip heads 29 that are positioned so to bear down on the top of the section blades at the back thereof to force them against the ledger plates 30. The guards 12-16 extend in front of the section blades in a converging manner toward an apex 31 in order to prevent the section blades from running into hard objects which might damage them. As can be seen in FIG. 2, a neck portion 33 of the guard 14 extends underneath the sickle bar 11 for fastening thereto. Guard 14 is provided with a groove 34 above ledger plate 30 that accommodates a forward portion of a sickle section blade 20. The procedure of replacing one of the blades 19-22 involves removal of the rivets 25, taking away the spent blade, replacing it with a new blade and installing new rivets 25. To this end, the tool of the invention finds utility.

A tool according to the present invention indicated generally at 37 is shown in FIG. 2 installed with respect to a section blade 20 fastened to the sickle bar 11 and in process of removing the sickle blade 20 for replacement. In FIG. 3 the tool 37 is shown from an orientation of 90 degrees to the right from that FIG. 2, and FIG. 4 the tool 37 is shown in section and in place for installation of a replacement section blade 20A.

Tool 37 includes an elongate tubular column 38 having a flanged upper open end 39. A handle 41 connects the column 38 to a base 42. Handle 41 has a lever arm 44 and an end clip 45 located on the free end of the lever arm 44. The fixed end of lever arm 44 has a pivot block 46. As shown in FIG. 3, the base 42 is an upwardly open U-shaped member. Pivot block 46 fits in the base 42 and is pivotally connected thereto by a lower pivot pin 49. The lower end of column 38 has a flat necked-in portion 50. Necked-in portion 50 fits in a slot in the end of pivot block 46 opposite the lower pivot 49. An upper pivot 48 pivotally connects the column 38 at the lower necked-in portion 50 to the pivot block 46. The lever arm and column 38 are movable with respect to the base 42 between a position shown in phantom in FIG. 2 and a position shown in full lines in FIG. 2. In the phantom position shown in FIG. 2 the column 38 is relatively lowered with respect to the base 42 and in the full line position it is relatively raised. The upper and lower pivots 48, 49 are related such that in moving from the lowered position of FIG. 2 to the raised position, the upper pivot passes vertically over the lower pivot 49 so as not to tend to return to the lowered position upon imposition of force at the top of the column 39. In the upper position of full lines, the end clip 45 at the end of lever arm 44 engages the surface of the column 39.

A support shaft assembly is installed in the open end 39 of column 38 and includes an elongate exteriorly threaded shaft 52 (FIG. 4). Shaft 52 has a diameter smaller that the inside diameter of the column 38. The lower end of shaft 52 is installed in the column 38. The upper end of shaft 52 has an enlarged head 53 with an upwardly open chamber or cup 54. A collar 56 surrounds the shaft 52 and has interior threads in threaded engagement with the exterior threads of the shaft 52. The position of the collar 56 on the shaft 52 is adjustable by rotating the collar with respect to the shaft. The outside dimension of the collar 56 is larger than the end opening 39 such that the collar 56 abuts the end 39 of column 38 and supports the shaft with respect to the column. The height of the head 53 above the column 38, or the height of the tool 37 is variable by varying the position of the collar 56 on the shaft 52. By holding the collar 56 stationary with respect to the column 38 and rotating the head 53 of shaft 52 the height of the stand is either increased or decreased according to necessity.

An anvil 58 is removably installed in the end cup 54 of head 53. Anvil 58 is used to install new rivets when fastening a replacement sickle section blade. Anvil 58 has one flat end 60 and a concave end 59 depending on the type of rivet being employed.

In the use of the tool 37, the tool is positioned beneath the sickle blade to be replaced. The tool is positioned on the ground o a suitable board or the like. The height of the tool is adjusted by holding the collar 56 and turning the head 53. Adjustment is made so that the head 53 (with the anvil removed) is positioned approximately one inch beneath the sickle blade with the column 38 in the lowered position or the position shown in phantom in FIG. 2. From that position, the lever arm 44 is raised up to a position of abutting relationship with the column 38 as shown in full lines in FIG. 2. This raises the head up into firm engagement with the sickle section blade to be replaced The rivet to be removed is located over the cup 54 of the head 53 of shaft 52. The sickle bar is raised slightly such that the tool 37 provides a very firm foundation for working on the rivet 25. The end of the rivet 25 is then removed using a chisel as indicated at 61 in FIG. 1. Next, a punch 63, as shown in FIG. 2, is used to drive the old rivet 25 from its position with respect to the spent sickle section blade 20 and dropped into the cup 54. This procedure is repeated on the remaining rivets holding the sickle section blade 20 to the cutting bar 24.

In use of tool 37 to install a new sickle section blade, as shown in FIGS. 3 and 4, anvil 58 is placed in the cup 54. If round-headed rivets are being used, the concave side 59 is upwardly facing. If flat-headed rivets are to be used, the flat side 60 of anvil 58 is upwardly facing. The tool is placed beneath the replacement rivet 25A with the column in the lowered position. The anvil is poised underneath the rivet which is loosely assembled to the replacement blade 20A. The heighth is adjusted until the top of the anvil is within about ⅜" of the head of the rivet. The lever 44 is raised thus raising the anvil 58 into firm engagement with the head of the rivet 25A. A hammer head 64 is applied to the opposite end of the rivet 25A expanding the rivet throughout its length and securing the sickle section blade 20A to the cutting bar 24. If desired, a riveter can be used in connection with the hammer. The procedure is repeated with respect to the remaining rivets in order to hold the sickle section blade 20A in place.

The embodiments of the invention in which an exclusive property or privilege is claimed are identified as follows:

1. A tool for use in removing rivets and installing rivets in replacement of a sickle section blade, comprising:

a tubular column having an upper open end;

a shaft having an upper end with a head and a lower threaded end;

a threaded collar located on the threaded end of the shaft and movable longitudinally on the shaft by rotation with respect to the shaft;

the lower end of the shaft being installed in the tubular column through the open end thereof up to the collar, said collar of a sufficient dimension to be in intercepting relationship to the open end of the column to support the shaft with respect to the column;

the heighth of said tool being adjustable by rotation of the collar on the shaft;

said head on the end of the shaft being configured to bear against a sickle section blade to permit work to be performed upon a rivet holding the blade;

said head on the end of the shaft having an upwardly open cup;

an anvil insertable in the cup of the head of the shaft for use in installing a rivet in a sickle bar to hold a replacement sickle section blade, said anvil having a first end that is concave for working on round headed rivets, and a second end that is flat for working on flat headed rivets;

a base connected to the lower end of the column; and means pivotally connecting the base to the lower end of the column.

2. A tool for use in removing rivets and installing rivets in replacement of a sickle section blade, comprising:

a tubular column having an upper open end;

a·shaft having an upper end with a head and a lower threaded end;

a threaded collar located on the threaded end of the shaft and movable longitudinally on the shaft by rotation with respect to the shaft;

the lower end of the shaft being installed in the tubular column through the open end thereof up to the collar, said collar of a sufficient dimension to be in intercepting relationship to the open end of the column to support the shaft with respect to the column;

the heighth of said tool being adjustable by rotation of the collar on the shaft;

said head on the end of the shaft being configured to bear against a sickle section blade to permit work to be performed upon a rivet holding the blade;

a base connected to the lower end of the column;

means pivotally connecting the base to the lower end of the column;

said means pivotally connecting the base to the lower end of the column including a lever structure including a lever arm having a first free end and a second fixed end pivotally fixed to the base, said second end of the lever having a pivot block;

a first pivot connecting the lower end of the column to the pivot block, a second pivot connecting the pivot block to the base, said first pivot being located between the second pivot and the free end of the lever whereby the tubular column is movable between a first lower position with the lever arm generally horizontally extended and a second raised position with the lever arm raised up against the column, and the first pivot being located above the second pivot.

3. The tool of claim 2 wherein: said first and second pivots are related in such a fashion that by moving from the first position to the second position the fist pivot passes vertically over the second pivot.

4. The tool of claim 3 wherein: the free end of the lever arm has a clip that fits around the tubular column.

5. The tool of claim 2 wherein: said head on the end of the shaft has an upwardly open cup.

6. The tool of claim 5 including: an anvil insertable in the cup of the head of the shaft for use in installing a rivet in a sickle bar to hold a replacement sickle section blade.

7. The tool of claim 6 wherein: said anvil has a first end that is concave for working on rounded headed rivets, and a second end that is flat for working on flat headed rivets.

* * * * *

UNITED STATES PATENT AND TRADEMARK OFFICE
CERTIFICATE OF CORRECTION

PATENT NO. : 5,148,589

DATED : September 22, 1992

INVENTOR(S) : Frederick R. Bot

It is certified that error appears in the above-identified patent and that said Letters Patent is hereby corrected as shown below:

Col. 1, line 11 after "replaced" insert ---.---.

Col. 1, line 31 after "blade" insert ---.---.

Col. 1, line 33 after "handle" insert ---.---.

Col. 1, line 33 after "end" insert ---.---.

Col. 1, line 45 "t" should be ---to---.

Col. 3, line 34 "o" should be ---or---.

Col. 3, line 44 after "replaced" insert ---.---.

Claim 3, Col. 6, line 1 "fist" should be ---first---.

Signed and Sealed this

Twenty-first Day of September, 1993

Attest:

BRUCE LEHMAN

*Attesting Officer*  *Commissioner of Patents and Trademarks*